Nov. 2, 1943.    M. J. O. LOBELLE    2,333,621
TOWING AND RELEASE MECHANISM
Filed March 10, 1942    5 Sheets-Sheet 1

INVENTOR
M. J. O. LOBELLE
BY
ATTORNEYS

Nov. 2, 1943.        M. J. O. LOBELLE         2,333,621
               TOWING AND RELEASE MECHANISM
             Filed March 10, 1942      5 Sheets-Sheet 2
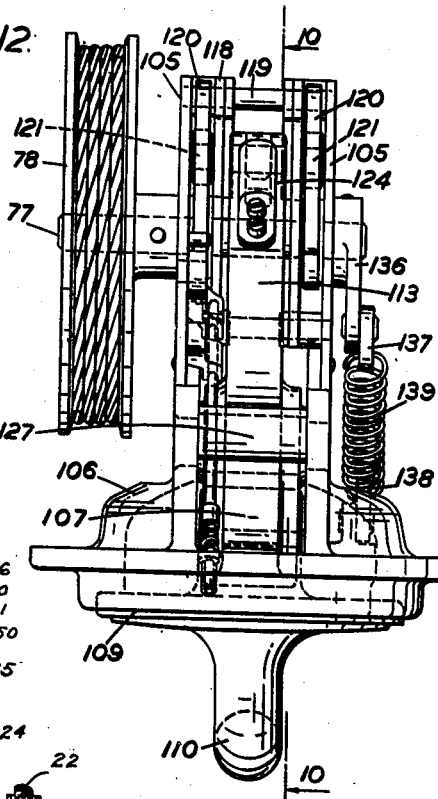
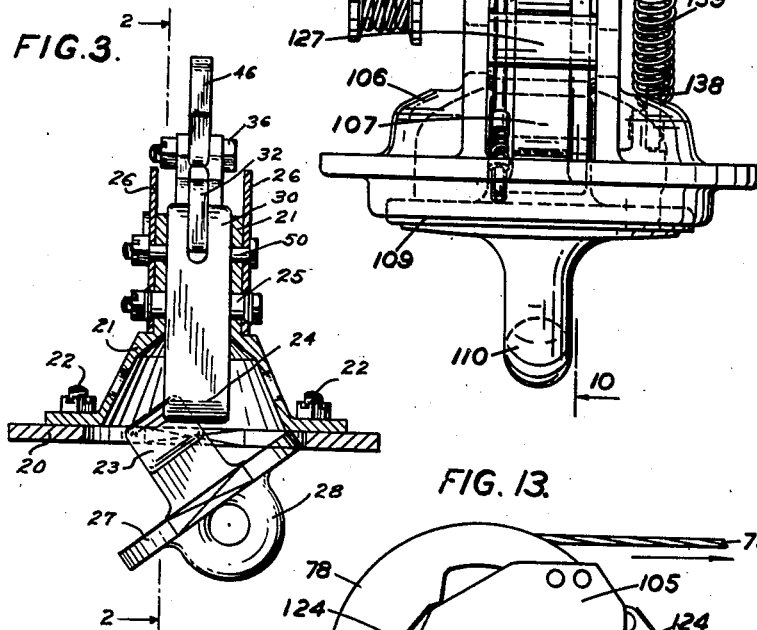
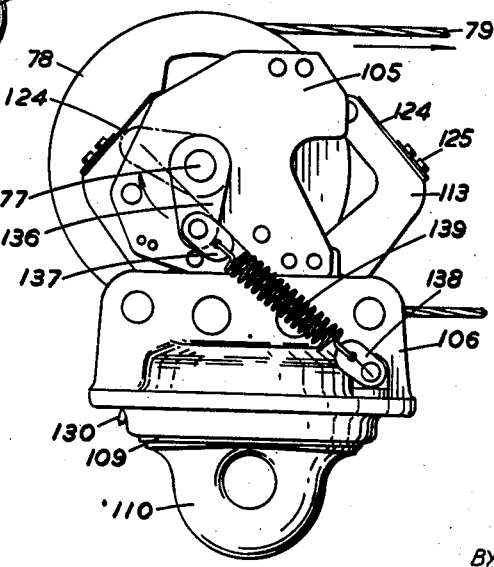
INVENTOR
BY M.J.O.LOBELLE
ATTORNEYS

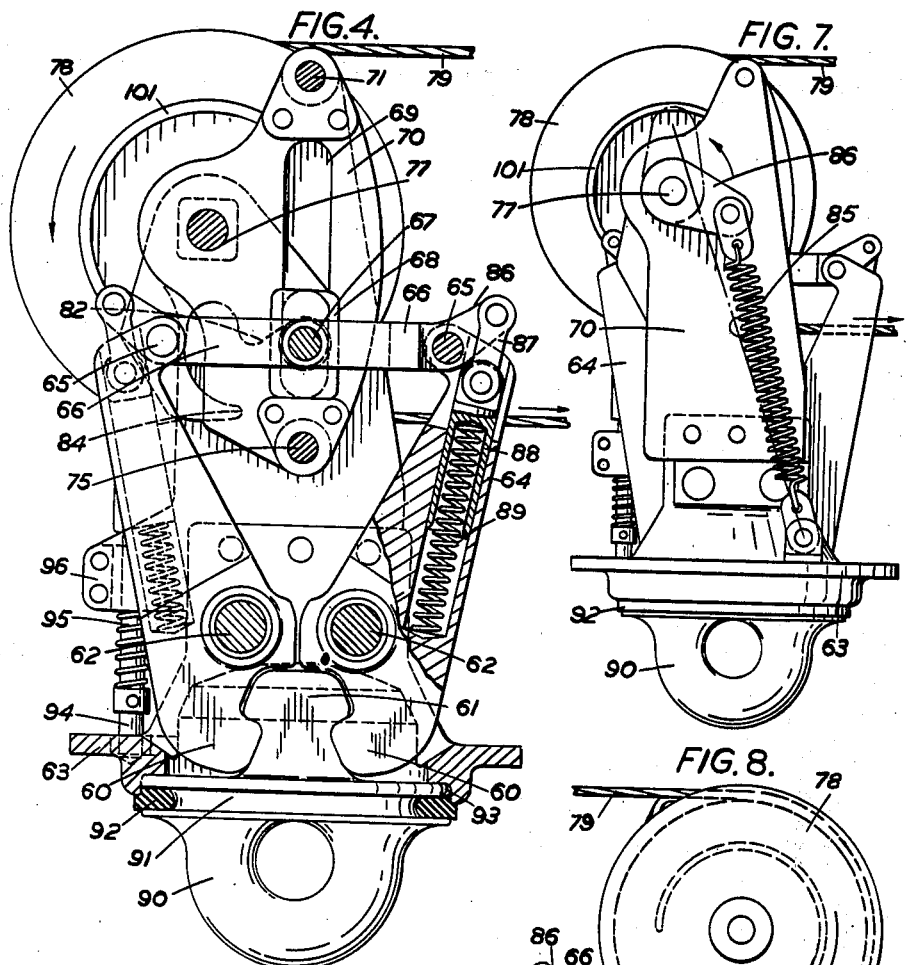

Nov. 2, 1943.    M. J. O. LOBELLE    2,333,621
TOWING AND RELEASE MECHANISM
Filed March 10, 1942    5 Sheets-Sheet 4
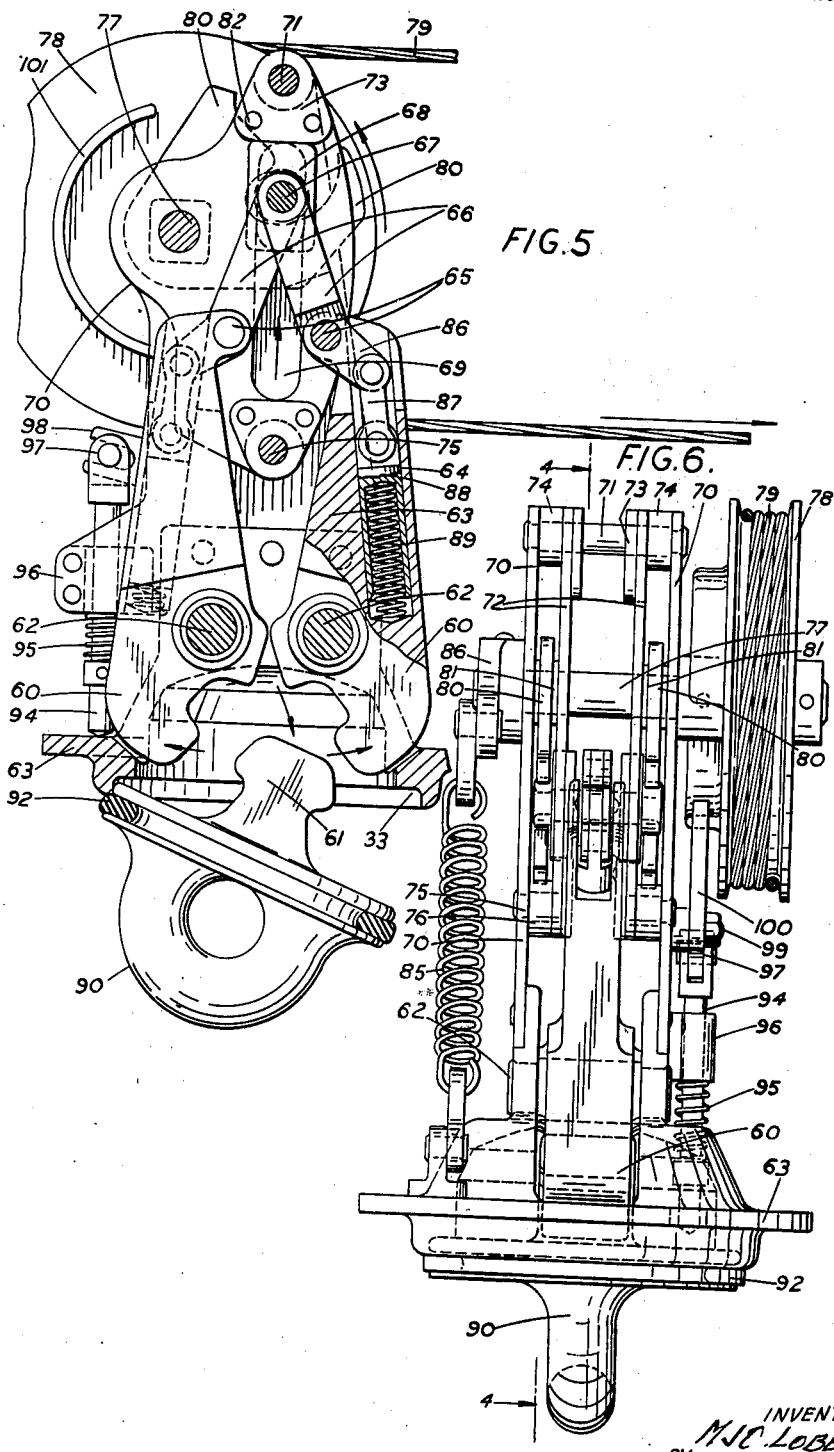

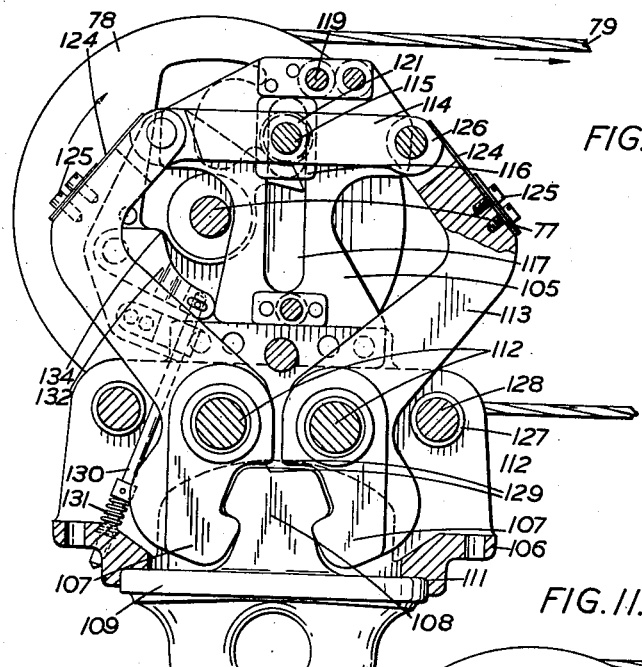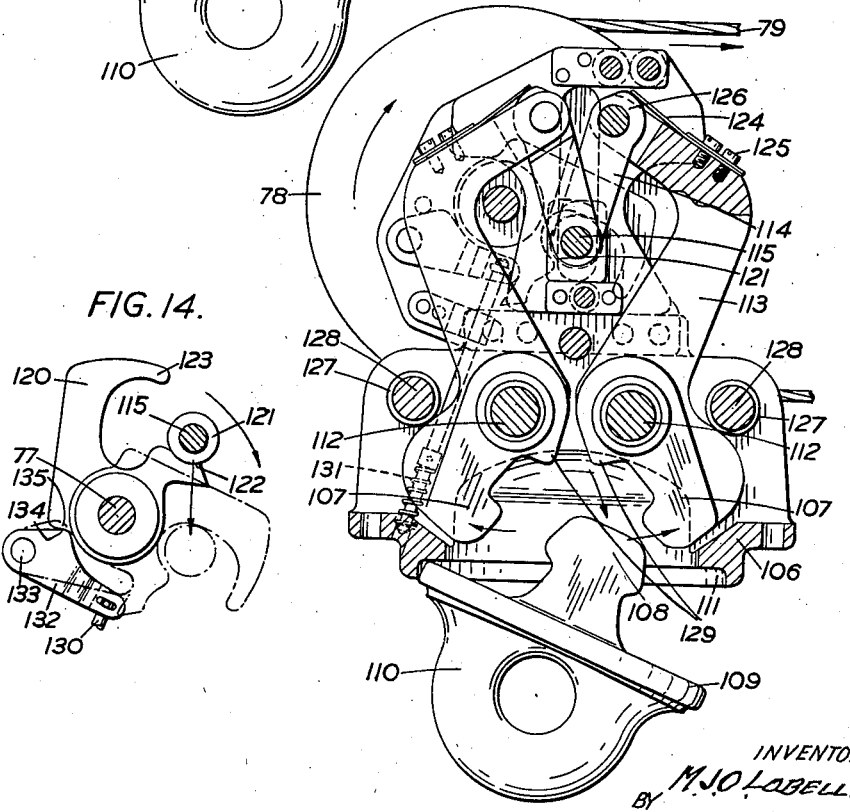

Patented Nov. 2, 1943

2,333,621

UNITED STATES PATENT OFFICE 2,333,621

TOWING AND RELEASE MECHANISM

Marcel Jules Odilon Lobelle, Slough, England, assignor to R. Malcolm Limited, Slough, England, a company of Great Britain Application March 10, 1942, Serial No. 434,146
In Great Britain March 12, 1941

19 Claims. (Cl. 280—33.15)

This invention relates to towing and release mechanism applicable for use in connection with aeroplanes and for other purposes. The mechanism has been designed more particularly for use in towing and releasing gliders or other planes which have to be towed in flight, but it is also applicable in any case where a load has to be supported and released with ease and certainty, for example in the carrying of heavy bombs on aircraft. It is an essential requirement of such mechanism that it shall be capable of supporting the pull or the load no matter in which direction it may act upon the eye or plug which is held and released by the mechanism. It must also be possible to effect the release with a comparatively small expenditure of force although the eye or plug must be held positively locked until it is intentionally released.

In carrying the invention into effect an attachment plate is provided with a recess into which a plug fits, the plug generally having an eye upon it for connection to the load or towing cable, and also having a hook-shaped head or projection adapted to engage with a pivoted hook mounted in a socket at the back of the attachment plate, the pivoted hook being associated with a locking and release mechanism whereby the hook can be held securely locked in one position and turned to release the plug when required. When a single hook member is used the fitting of the plug into the socket, and of the hook-shaped projection into the recess, is relied upon to maintain this projection in engagement with the hook until positively released therefrom. Alternatively a pair of hooks may be used engaging with the projection on the plug from opposite sides, the hooks being linked together for simultaneous operation in closing them upon the headed projection on the plug, locking them in the closed position, and for releasing them from this projection when required. With the operating mechanism for the hook or hooks there may be associated a spring-presssed plunger serving as an indicator and normally projecting slightly from the attachment plate when the plug is securely held by the hook or hooks, and when the operating member is in the locking position. The arrangement is such that when the operating member begins to move with a view to turning the hook or hooks and so releasing the plug, the indicator is immediately withdrawn, before any actual releasing can occur. The projection of the indicator from the attachment plate can therefore be relied upon to show that the mechanism is in the fully engaged and locked position.

In one of its aspects the towing and release mechanism according to this invention comprises a plug member normally held engaged by a hook or hooks which is or are held locked in the engaging position until positively operated for releasing purposes, the plug member being formed as a disc for fitting into a recess, with a headed projection for engaging with the hook or hooks, and with an eye or the like for supporting the pull or the load, so that whether the pull on the plug is directly outwards, or is in any other direction which tends to cause the disc to pivot about its edge in the recess, the headed projection of the plug member exerts a force in substantially the same direction on the engaging surface of the hook or hooks, whilst the positive retraction of the hook or hooks is effective to release the plug immediately no matter in which direction it is being pulled at the moment of release.

In another aspect, the towing and release mechanism according to the invention comprises a fixed member with a socket and releasable locking mechanism within the said socket, and a removable member in the form of a plug with a headed projection adapted to be engaged by the said releasable locking mechanism, a disc which fits in a recess in the fixed member, and an eye or the like for supporting the load, the construction being such that no matter in which direction below the plane of the disc that the pull of the load may be acting on the eye or the like at the time of release, the removable plug member will either pivot about the edge of its disc in the recess or will be drawn directly away from the recess, and in either case the direction in which the forces are applied between the plug and the releasable locking mechanism when the releasing action begins will be substantially the same.

The invention is illustrated in the accompanying drawings which show by way of example three forms of construction.

Figure 3 is an end view partly in section on the line 3—3 of Figure 2, showing the hook in the same position as in Figure 2;

Figure 4 is a side view, partly in section, on the line 4—4 of Figure 6, showing a form of the release mechanism with a pair of hooks, in the engaged position;

Figure 5 shows the same mechanism with the hooks in the releasing position;

Figure 6 is an end view of the same mechanism as in Figure 4;

Figure 7 is a side elevation of the mechanism of Figure 4;

Figure 8 shows the same mechanism as seen from the opposite side;

Figure 9 is a detail view of the cam shown in Figure 4, illustrating its action;

Figure 10 is a side view, partly in section on the line 10—10 of Figure 12, showing a modified form of construction, also having a pair of hooks;

Figure 11 shows the construction of Figure 10 with the hooks in the releasing position;

Figure 12 is an end view of the construction of Figure 10;

Figure 13 is a side elevation of the construction of Figure 10; and

Figure 14 is a detail view of the cam of the Figure 10 construction, illustrating its action.

Figure 1:
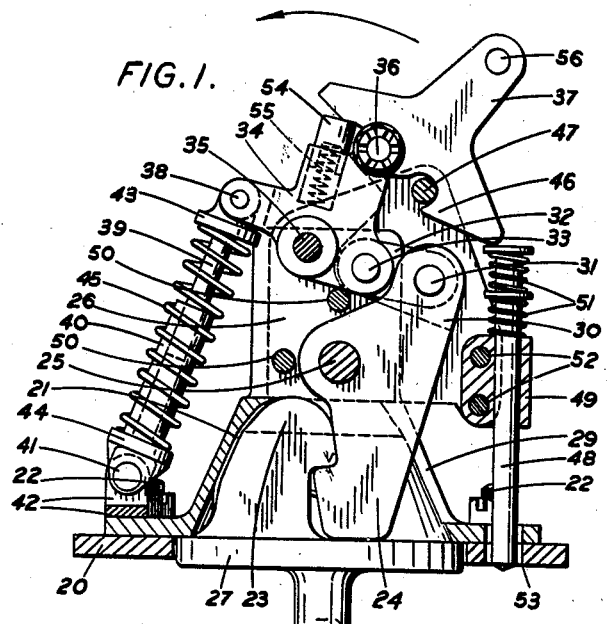
Figure 1 is a side view, partly in section, showing a form of the release mechanism with a single hook, in the engaged position.
Figure 2:
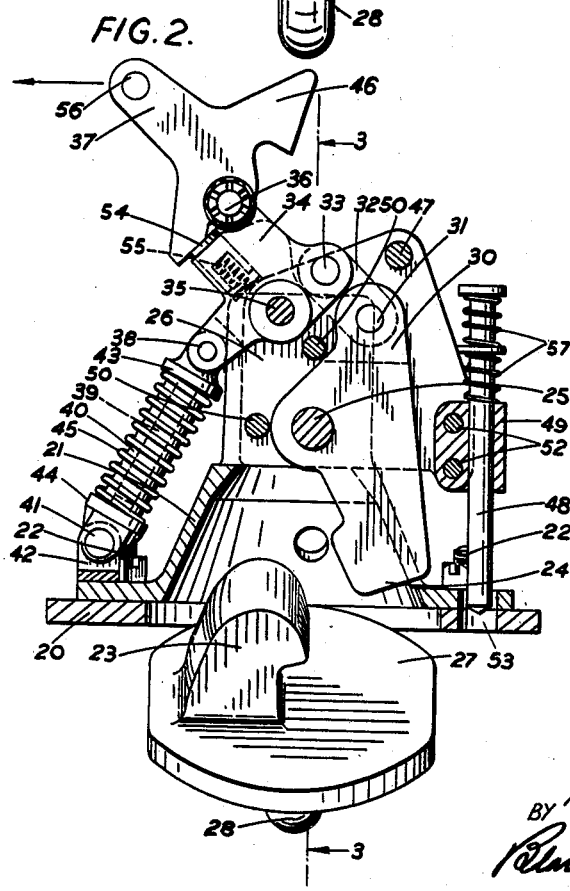
Figure 2 is a similar view partly in section on the line 2—2 of Figure 3, showing the hook retracted for releasing the plug member.

Referring first to Figures 1 to 3, 20 is the attachment plate which may be fitted to a part of the fuselage of an aeroplane, for example, and 21 is a hollow casting secured to the plate 20 by bolts 22. The plug member has a headed projection 23 which normally fits into the recess in the casting 21 and is engaged by the hook 24 which is pivotally supported on a transverse stud 25. Two side plates 26 are secured by bolts 60 to upward projections of the casting 21, and the stud 25 passes through these upward projections and the side plates 26. The plug member has a disc 27 which may be of any suitable shape, and which rests against the base of the casting 21 in a socket formed by the aperture in the attachment plate 20 as seen in Figure 1. The load is applied to the plug member by an eye 28 which receives the end of the towing cable (not shown) or any other attached element, and the pull on the plug can be applied in any direction beyond the plane of the attachment plate 20. The hook 24 operates in a slot at 29 in the casting 21 allowing the hook to be retracted as shown in Figure 2.

The tailpiece 30 of the hook 24 is forked and has a transverse pin 31 supporting one end of a link 32, whose other end is pivotally connected at 33 to a rocking member 34. The rocker 34 turns on a fixed stud 35 secured in the side plates 26 and the upward projections of the casting 21. The rocker 34 has three forked arms, one connected to the link 32 as above stated, a second carrying a stud 36 serving as a pivot for a latch member 37, and a third connected by a pivot 38 to a plunger 39. This plunger works in the socket of a member 40 which is pivoted at 41 in lugs on a bracket 42 attached to the foot of the casting 21, the plunger having a flange 43 and the member 40 having a flange 44 between which is disposed a strong spring 45. This spring tends to hold the rocker 34 in the position of Figure 1, and so to extend the link 32, which in turn presses outwards the tailpiece of the hook 24, holding its hooked end in the position for engaging the projection 23 of the plug member. The latch member 37 has an arm formed with an eye 56 for the attachment of any suitable operating element (not shown) whereby a pull may be applied to the latch member in the direction of the arrows in Figures 1 and 2. The righthand arm 46 of the latch member is hooked for engaging over a transverse pin 47 extending between the side plates 26. The end of the arm 46 normally bears upon the head of a plunger 48 which is guided in a bracket 49 attached by bolts 52 to the side plates 26, and pressed up by light springs 51. The end of this plunger normally projects through apertures at 53 in the base of the casting 21 and in the attachment plate 20, as seen in Figure 1. When in this position the end of the plunger can be seen or felt by hand, and it only remains in this position so long as it is depressed by the arm 46 of the latch member 37. To hold the latch member in this position a plunger 54 is provided engaging in a socket in the rocker 34 and pressed outwards by a comparatively strong spring 55.

With this construction, the rocker 34 and the link 32 act as a toggle between the fixed pivot 35 and the pivot 31 in the tailpiece 30 of the hook member 24, so holding the hook positively in the engaging position, under the action of the powerful spring 45. Further, the latch 37 is forced over toward the right in Figure 1, by the action of spring 55, so that its hooked end 46 engages over the pin 47, thus providing an additional positive lock for the hook member 24. The springs 51 are light springs which are easily compressed as the latch is turned by the action of the socketed spring 55 bearing on the plunger 54. For releasing the hook 24 a pull is applied to the eye 56 in the direction of the arrows in Figures 1 and 2, first causing the latch member to turn until the spring 55 is compressed by the plunger 54, and then causing the rocker to turn against the resistance of spring 45 so as to break the toggle and draw up the link 32, until the hook 24 releases the projection 23 of the plug member, allowing it to draw away as indicated for example in Figures 2 and 3. No matter in which direction the pull on the eye 28 may be applied, the plug either pulls away directly or rocks about the edge of the disc 27 at some point while the projection 23 moves away from the hook 24. This projection is normally trapped between the socket of the casting 21 and the end of the hook 24, while the disc 27 is bearing against its seating, so that the plug cannot move, and the pull upon it in any direction causes the projection 23 to pull upon the hook 24 with a force acting outwardly against the lip of the hook substantially normal to the engaging faces if they are shaped as shown. As the hook is drawn back, the headed projection 23 begins to move outwardly either directly or by a rocking movement for example as in Figures 2 and 3, and the increasing slope of the lip of the hook 24 then results in a component of the pulling force tending to press back the hook still further, but until the hook 24 begins to turn the direction of the force acting between the projection 23 and the hook 24 due to any pull on the plug member is in a plane substantially passing through the supporting stud 25.

The pull for releasing purposes might, of course, be applied directly to the upper arm of the rocker 34, but it is preferable to apply it to the latch 37 pivoted on the rocker, partly to provide for an increased leverage about the pivot 35, and partly to provide for a simple form of positive lock by the latch arm 46 engaging the pin 47. This lock would be effective even if the toggle between rocker 34 and link 32 were only straightened out or not quite straightened out in the closed position of the hook 24. Another advantage of the use of the latch member 37 to which the pull for releasing purposes is applied, is that there is a considerable movement allowed to the three-armed latch member 37 before it begins to move the rocking member 34, so that any unintentional or small movements of the control will not even begin to move the hook 24 which engages with the projection 23 on the plug, or tend to permit this hook to release the plug. Again, the rocking member 34 itself may be arranged as shown to have a considerable movement on its pivot 35, while the link 32 connecting it to the tailpiece 30 of the hook 24 turns upon its cross pin 31, before the pull on this link becomes effective to turn the hook for releasing the plug. This again ensures that no unintentional or partial movements will suffice to effect release of the plug.

In the form of construction shown in Figures 4 to 9 two hooks 60 are provided adapted to engage from opposite sides with a headed projection 61 on the plug member. The hook members 60 are mounted to turn on substantial studs 62 which pass through the casting 63, and the tailpieces 64 of the hooks extend upwardly at the back of the casting, each tailpiece being forked at its end and provided with a pivot 65 for a link 66. The links are connected together at the spindle 67 so that they can act as a toggle to spread the tailpiece as shown in Figure 4, and so to hold the hooks 60 in the engaging position, the spindle 67 being mounted at its ends in slides 68 which work in slots at 69 in side plates 70 secured to the casting 63. The side plates are connected together at the top by riveted bolt 71 which has spacers 74 on it, spacing apart inner plates 72 secured by distance piece 73. Riveted bolt 75 and spacers 76 support the lower ends of plates 72, which are slotted similarly to the side plates 70 to let the spindle 67 and slides 68 move therein. The side plates 70 carry an operating shaft 77 which in this example has at one end a pulley 78 around which is lapped an operating cable 79 leading to a distant position from which the release device can be operated. The shaft 77 carries cams 80 which in this construction work between the pairs of plates 70, 72 and engage with cam followers 81 in the form of rollers mounted on the spindle 67 between the plates 70 and 72. In the normal position of the parts, with the hooks 60 closed on the headed projection 61, as shown in Figure 4, a part 82 of each of the cams 80 bears on the followers 81 and so locks the spindle 67 in the position with the links 66 extended. The shaft 77 has a crank arm 86 which is normally pulled downwardly by a spring 85, in a direction such as to hold the cams 80 in the locking position of Figure 4. When the cam shaft is turned in a counterclockwise direction from the position of Figure 4 to that of Figure 5 against the action of the spring 85, the locking surfaces 82 first move away from the cam followers 81, after a turning movement of about 10° which is sufficient to ensure that small or unintentional movements of the control do not start the release, and then a toe-piece 84 on each cam engages the follower and lifts the spindle 67 positively from the position of Figure 4 to that of Figure 5. This breaks the toggle between the links 66 and draws together the tailpieces of the hooks 60, causing them to release the headed projection 61 of the plug. The cams 80 are cut away in the centre as seen in Figure 9 to allow clearance for the free movements of the cam followers 81 when being raised by the toe-pieces 84 of the cams. The links 66 are provided with tailpieces 86 connected by members 87 to plungers 88 which work in recesses in the tailpieces 64 of the hooks 60, and are pressed upwards by springs 89. These springs are compressed when the cams 80 are operated to lift the cam followers 81, and to break the toggle between the links 66, as shown in Figure 5, and when the cams 80 are allowed to move back under the action of the spring 85, the springs 89 also act to cause the links 66 to straighten out the toggle again as in Figure 4. The cams 80 therefore do not require to have surfaces for pressing down the cam followers 81, but the cam surfaces 82 merely come into locking engagement with the cam followers at the end of this return movement of the cams.

The springs 89 serve a further purpose, namely to cushion the movements of the hooks 60 in relation to the control mechanism and the cams, and so to minimise shocks transmitted to the control mechanism during releasing of the load by the hooks. The release may be very sudden as the hooks are separated, if there is a heavy pull on the eye 90 of the plug member. This member has a groove at 91 in its disc portion in which is fitted a collar 92 of rubber or the like. This collar bears against the edge of the socket formed at 93 in the base of the casting 63 when the plug is held in position in the socket, and acts as a gland preventing the passage of air, water and so forth. The collar 92 also forms a buffer to minimise damage by the plug member if it hits any part of the towing or towed member after release.

In this form of construction also an indicator is provided consisting of a rod 94 whose end is caused to project slightly from the base of the casting 63 when the cam 80 is in the locking position. The rod 94 is pressed downwards by a spring 95, and is guided in a bracket 96 on the casting. Its upper end has a pin-and-slot connection at 97 with the arm 98 of a bell-crank lever pivoted on the casting 63 at 99. The arm 100 of this lever engages with an arc-shaped cam surface 101 on the face of the pulley 78 as best seen in Figure 8. When the pulley is turned in the direction of the arrows in Figures 4, 7 and 8 to cause the cams 80 to operate the hooks 60 for releasing purposes, the cam surface 101 acts on the arm 100 to turn the bell-crank lever and to lift the indicating rod 94 so that its end no longer projects. The rod is held up until the parts are returned fully to the locking position again.

In place of the pulley 78 and cable 79 for operating the cams any other suitable operating mechanism can be used and this is illustrated only by way of example.

Figures 10 to 14 illustrate a form of the release mechanism in many respects like that of Figures 4 to 9, but with cams which draw down the cam followers instead of drawing them away from the hooks. This has the advantage that the device takes up less room rearwardly and can be used in places where there is not room for the construction of Figures 4 to 9. Again the pulley 78 and cable 79 are shown for operating purposes and the cam shaft 77 is supported in side plates 105 attached to the casting 106 in which the hooks 107 operate. The shaft 77 has a crank arm 136 at one end, to which is pivoted an eye 137 forming an attachment for one end of a tension spring 139, whose other end is connected to an attachment eye 138 pivoted on the base of the casting 106. This spring tends to hold the parts in the locked position of Figure 10. The towing plug has a headed projection 108 engaged by the hooks, an eye 110 for carrying the load, and a flange or disc 109 which seats in a socket 111 in the casting 106. The hooks are supported on pins 112 in the casting, and have tailpieces 113 connected at their ends by links 114 which are pivoted on a sliding spindle 115. This spindle is guided by sliders 116 in the slots 117 in the side plates 105, and in intermediate plates 118 which are attached to the side plates 105 by rivets 119 and spacers as in the last described construction. The cams 120 engage with the cam followers 121 on the spindle 115, by locking surfaces 122 as seen in full lines in Figure 14, and by toe pieces 123 for drawing down the cam followers and the spindle 115 when required for releasing the hooks 107. In this case flat springs 124 secured by screws 125 on the tailpieces 113 engage with flats on the ends 126 of the links 114 to hold the links in the extended position as shown in Figure 10, and to oppose a resistance to their movement. When the spindle 115 is drawn down by the cams 120, the springs 124 are flexed by the projecting surfaces on the ends 126 of the links 114 as seen in Figure 11. The backs of the hooks 107 abut against collars 127 upon transverse pins 128 in the casting 106 when the hooks are fully opened as in Figure 11.

The indicator in this case is a rod 130 with a spring 131 which tends to retract it, the top of the rod being connected to a lever 132 pivoted at 133 on the side plate. This lever has a boss 134 which co-operates with a projection 135 on the back of the cam 120 as shown in Figure 14. When the cam is in the locking position, as shown in full lines in this figure, the projection 135 acting on the boss 134 on lever 132 depresses this lever causing the end of the indicator rod 130 to project from the casting 106 as seen in Figure 10. When the cam turns for releasing purposes the surfaces 134 and 135 separate, and the indicator is retracted by its spring 131.

Each form of the device has been described for convenience as if it were in a vertical position with the plug underneath, but of course it can be used in any position, and for towing purposes it would generally project towards the side or the rear of the fuselage of the towing plane or tug, and from the front or side of the nose of the towed member or glider. When the device is used for supporting bombs it will generally be in an upright position with the plug underneath it. In all cases, no matter in which direction the pull on the plug may come, the engagement of the disc on the plug with the recess ensures that the headed projection can only pull outwardly either in a direct line or around one edge of the recess acting as a fulcrum, so that the forces exerted on the hooks are always substantially in the same direction, namely normal to the surfaces on the underside of the head which engage with the hooks. For the purpose of ensuring release of the plug in spite of icing conditions or the like the hooks may be formed with knuckle surfaces just above the head of the projection on the plug, as shown at 129 in Figures 10 and 11. These knuckle surfaces 129 come close together at the centre line between the hooks in the position of Figure 10, and when the hooks are turned for releasing purposes as in Figure 11 they bear down on the head 108 of the plug, so positively pushing it out if it tends to stick. Normally of course the pull on the plug will ensure that it drops away the moment it is released by the hooks.

The invention is not limited to the details of the mechanism above described, and for example many arrangements of springs are possible for ensuring the return of the parts to the locking position. The spring may be arranged to act direct on the slide carrying the follower, tending to pull it in a direction to hold the links extended and the hooks closed.

The links may be arranged to move exactly into line with one another, or they may be arranged to pass the centre line position so as to act as a toggle positively restricting turning movements of the hooks in the releasing direction. By adjustment of the position of the links when the hooks are in the closed condition it is possible to vary the force required for releasing purposes when the plug is under load. In some cases it may be desirable to arrange matters so that the pull on the plug is actually tending to spread the hooks and to push the follower upwards, being restricted by the spring and linkage so that the force required to initiate the releasing action may be made comparatively small. In all cases, however, it will be essential for the operating mechanism to be moved positively under manual control before any release can take place, and the cam will exercise a positive lock on the follower over the first part of this movement, preventing any risk of unintentional or premature release.

I claim:

1. Towing and release mechanism consisting of a fixed member and a releasable plug member, said fixed member comprising at least one pivoted hook element, means for locking said hook element in the engaged position and for withdrawing it for release, and a part formed with a seating, said plug member comprising a headed projection adapted to be engaged by said pivoted hook element, a laterally projecting portion adapted to engage the seating aforesaid, and means for applying the load to said plug, the engaging surfaces between said hook element and the headed projection of said plug member being within said fixed member in proximity to the seating which receives the laterally projecting portion of said plug member whereby, when the load on the plug tends to cause it to rock about the edge of the laterally projecting portion on the seating, the forces acting between the engaging surfaces of the headed projection and hook element aforesaid are approximately normal to said surfaces.

2. Towing and release mechanism consisting of a fixed member and a releasable plug member, the plug member comprising a headed projection, a laterally projecting portion in the neighbourhood of said projection and extending on all sides to form a surface about which the plug member may fulcrum when subjected to a pulling force in any direction below the plane of said laterally projecting portion, and means for applying the load to said plug member below the plane of said laterally projecting portion, said fixed member comprising a seating adapted to receive said laterally projecting portion of the plug member, means for engaging with said headed projection adapted to hold said plug member positively engaged, and means for effecting release of such engagement while the plug member is under load.

3. Towing and release mechanism, consisting of a fixed member and a releasable plug member, said fixed member comprising a part formed with a seating, at least one hook element and a pivot supporting the same, said hook element having a tail piece extending beyond said pivot, a rocker and means pivotally supporting it in said fixed member, a link connecting an arm of said rocker to the tailpiece of said hook element, spring means tending to turn said rocker in a direction such as to extend said link and to hold said hook element in the engaging position, actuating means for turning said rocker against the action of said spring means in order to release said hook element, said plug member comprising a headed projection adapted to be engaged by said hook element, a laterally projecting portion adapted to rest upon the seating in said fixed member, and an eye adapted to take the pull of the load.

4. Towing and release mechanism consisting of a fixed member and a releasable plug member, said fixed member comprising a part formed with a seating, at least one hook element and a pivot supporting the same, said hook element having a tail piece extending beyond said pivot, a rocker and means pivotally supporting it in said fixed member, a link connecting an arm of said rocker to the tail piece of said hook element, spring means tending to turn said rocker in a direction such as to extend said link and to hold said hook element in the engaging position, an operating member pivotally mounted on said rocker and formed with a latch adapted to engage with a part of said fixed member when at rest, a spring tending to turn said operating member in the direction to hold said latch in engagement, and an arm on said operating member whereby it may be pulled back against said spring to release said latch and then to turn said rocker against the action of the spring means aforesaid, whereby said hook element may be turned for releasing purposes, said plug member comprising a headed projection adapted to be engaged by said hook element, a laterally projecting portion adapted to rest upon the seating in said fixed member, and means for applying a load to the plug member.

5. Towing and release mechanism consisting of a fixed member and a releasable plug member, said fixed member comprising a part formed with a seating, at least one hook element and a pivot supporting the same, said hook element having a tail piece extending beyond said pivot, a rocker and means pivotally supporting it in said fixed member, a link connecting an arm of said rocker to the tail piece of said hook element, spring means tending to turn said rocker in a direction such as to extend said link and to hold said hook element in the engaging position, actuating means for turning said rocker against the action of said spring means in order to release said hook element, an indicator and a spring tending to withdraw said indicator within said fixed member, means operated by the actuating means aforesaid for projecting said indicator against the action of its spring, said plug member comprising a headed projection, a portion surrounding the base of said headed projection adapted to rest on the seating in said fixed member, and means for applying the load to said plug member.

6. Towing and release mechanism consisting of a fixed member and a releasable plug member, said fixed member comprising at least one hook element and a pivotal support therefor, spring means tending to hold said hook element in the engaged position, operating means for drawing back said hook element against the spring action and for holding said hook element positively locked in the engaging position, said plug member comprising an inwardly projecting portion formed with a complementary surface for engaging said hook element, a laterally projecting portion adapted to seat upon said fixed member, and means for applying a load to said plug member.

7. Towing and release mechanism consisting of a fixed member and a releasable plug member, said fixed member comprising at least one hook element and a pivotal support therefor, spring means tending to hold said hook element in the engaged position, operating means for drawing back said hook element against the spring action and for holding said hook element positively locked in the engaging position, an indicator comprising a rod, a spring tending to withdraw said rod, and a part operated by the operating means for the said hook element for causing said indicator to project when said operating means is in the position of rest and holding said hook element positively locked, said plug member comprising an inwardly projecting portion formed with a complementary surface for engaging said hook element, a laterally projecting portion adapted to seat upon said fixed member, and means for applying a load to said plug member.

8. Towing and release mechanism consisting of a fixed member and a releasable plug member, said plug member comprising a headed projection, a portion extending outwardly around the base of said projection, and means for applying a load to said plug member, said fixed member comprising a recessed part adapted to receive the outwardly projecting portion of said plug member, a pair of hook elements adapted to engage with said headed projection, and operating mechanism for separating and bringing together said hook elements and for locking them in the engaging position.

9. Towing and release mechanism consisting of a fixed member and a releasable plug member, said plug member comprising a headed projection, a portion extending outwardly around the base of said projection, and means for applying a load to said plug member, said fixed member comprising a recessed part adapted to receive the outwardly projecting portion of said plug member, a pair of hook elements adapted to engage with said headed projection, pivotal supports for said hook elements, linkage connecting together said hook elements for simultaneous operation, and cam mechanism adapted to operate upon said linkage for locking the hook elements in the engaging position and for separating said hook elements for releasing purposes.

10. Towing and release mechanism consisting of a fixed member and a releasable plug member, said plug member comprising a headed projection, a portion extending outwardly around the base of said projection, and means for applying a load to said plug member, said fixed member comprising a recessed part adapted to receive the outwardly projecting portion of said plug member, a pair of hook elements adapted to engage with said headed projection, each of said hook elements having a projecting tail piece, pivotal supports for said hook elements, jointed linkage connecting together the tail pieces of said hook elements, a cam follower at a joint in said linkage, and a cam adapted to operate on said cam follower to lock the linkage in one position with the hook elements in the position for engagement with said headed projection, and when displaced from that position to move said linkage in a direction such as to cause said hook elements to separate at their engaging faces.

11. Towing and release mechanism consisting of a fixed member and a releasable plug member, said plug member comprising a headed projection, a portion extending outwardly around the base of said projection, and means for applying a load to said plug member, said fixed member comprising a recessed part adapted to receive the outwardly projecting portion of said plug member, a pair of hook elements adapted to engage with said headed projection, and operating mechanism for separating and bringing together said hook elements and for locking them in the engaging position, an indicator, a spring adapted to retract said indicator, and means actuated by said operating mechanism for moving said indicator to the indicating position only when said operating mechanism is in the position for locking said hook elements in the engaging position.

12. Towing and release mechanism consisting of a fixed member and a releasable plug member, said plug member comprising a headed projection, a portion extending outwardly around the base of said projection, and means for applying a load to said plug member, said fixed member comprising a recessed part adapted to receive the outwardly projecting portion of said plug member, a pair of hook elements adapted to engage with said headed projection, pivotal supports for said hook elements, linkage connecting together said hook elements for simultaneous operation, springs associated with said linkage tending to bias it into the position in which said hook elements are held in the engaging position, and cam mechanism adapted to operate upon said linkage for locking the hook elements in the engaging position and for separating said hook elements for releasing purposes.

13. Towing and release mechanism consisting of a fixed member and a releasable plug member, said plug member comprising a headed projection, a portion extending outwardly around the base of said projection, and means for applying a load to said plug member, said fixed member comprising a recessed part adapted to receive the outwardly projecting portion of said plug member, a pair of hook elements adapted to engage with said headed projection, each of said hook elements having a projecting tail piece, pivotal supports for said hook elements, jointed linkage connecting together the tailpieces of said hook elements, springs acting upon said linkage in a direction tending to hold it in the position in which said tail pieces are held separated with the hook elements in the engaging position, a cam follower at a joint in said linkage, and a cam adapted to operate on said cam follower to lock the linkage in one position with the hook elements in the position for engagement with said headed projection, and when displaced from that position to move said linkage in a direction such as to cause said hook elements to separate at their engaging faces.

14. Towing and release mechanism consisting of a fixed member and a releasable plug member, said plug member comprising a headed projection, a portion extending outwardly around the base of said projection, and means for applying a load to said plug member, said fixed member comprising a recessed part adapted to receive the outwardly projecting portion of said plug member, a pair of hook elements adapted to engage with said headed projection, each of said hook elements having a projecting tail piece, pivotal supports for said hook elements, jointed linkage connecting together the tail pieces of said hook elements, a cam follower at a joint in said linkage, means for guiding said cam follower in its movements towards and away from the plane of the connections between said linkage and the tail pieces of said hook elements, and a cam adapted to operate on said cam follower to lock the linkage in one position with the hook elements in the position for engagement with said headed projection, and when displaced from that position to move said linkage in a direction such as to cause said hook elements to separate at their engaging faces.

15. Towing and release mechanism consisting of a fixed member and a releasable plug member, said plug member comprising a headed projection, a portion extending outwardly around the base of said projection, and means for applying a load to said plug member, said fixed member comprising a recessed part adapted to receive the outwardly projecting portion of said plug member, a pair of hook elements adapted to engage with said headed projection, each of said hook elements having a projecting tail piece, pivotal supports for said hook elements, jointed linkage connecting together the tail pieces of said hook elements, a cam follower at a joint in said linkage, and a cam adapted to operate on said cam follower to lock the linkage in one position with the hook elements in the position for engagement with said headed projection, and when displaced from that position to move said linkage in a direction such as to cause said hook elements to separate at their engaging faces, an indicator, and means operated by said cam adapted to project said indicator into the indicating position only when said cam is locking the hook elements in the position for engagement with said headed projection.

16. Towing and release mechanism consisting of a fixed member and a releasable plug member, said plug member comprising a headed projection, a portion extending outwardly around the base of said projection, and means for applying a load to said plug member, said fixed member comprising a recessed part adapted to receive the outwardly projecting portion of said plug member, a pair of hook elements adapted to engage with said headed projection, pivotal supports for said hook elements, linkage connecting together said hook elements for simultaneous operation, a strong spring acting upon said linkage in a direction such as to cause said hook elements to move into the engaging position, and cam mechanism adapted to operate upon said linkage for locking the hook elements in the engaging position and for separating said hook elements for releasing purposes against the action of said strong spring.

17. Towing and release mechanism consisting of a fixed member and a releasable plug member, said fixed member comprising a part formed with a seating adapted to receive an outwardly extending portion of said plug member, a pair of hook elements and pivotal supporting means therefor, each hook element having a tail piece extending beyond the pivotal supports, links connecting the tail pieces of said hook elements, a cam follower at the point of connection between said links, spring means tending to hold said cam follower in a position with the tail pieces of the hook elements separated and the hook portions in their engaging positions, a cam having a locking surface adapted in one position of said cam to hold said cam follower in the position wherein the hook portions of the hook elements are in the engaging position, said cam also having a lifting surface adapted when the cam is turned from the locking position to lift the cam follower, draw back the links and draw towards one another the tail pieces of said hook elements, whereby the hook portions may be separated, and said plug member comprising an inward projection formed with complementary surfaces adapted for engagement with said hook elements, a laterally projecting portion adapted to engage with the seating of said fixed member, and means for applying a load to said plug member.

18. Towing and release mechanism consisting of a fixed member formed with a seating, and a releasable plug member formed with a laterally projecting part adapted to rest on said seating, a pair of hook elements and means pivotally supporting them in said fixed member, operating mechanism for said hook elements adapted to lock them in the engaging position and, when operated, to separate said hook elements at their effective engaging surfaces, strong spring means tending to hold said operating mechanism in its locking position, said plug member also comprising a part adapted to be engaged by said hook elements for securing said plug member on said seating and means for applying a load to the plug member.

19. Towing and release mechanism consisting of a fixed member and a releasable plug member, said fixed member comprising at least one hook element and a pivotal support therefor, spring means tending to hold said hook element in the engaged position, operating means for drawing back said hook element against the spring action and for holding said hook element positively locked in the engaging position, said hook member also having a part thereof so shaped that when the hook member is drawn back against the spring action the said part will bear upon a portion of said plug member for imparting a positive outward thrust to said plug member, and said plug member comprising an inwardly projecting portion formed with a complementary surface for engaging said hook element, a laterally projecting portion adapted to seat upon said fixed member, and means for applying a load to said plug member.

MARCEL JULES ODILON LOBELLE.